United States Patent
Liu et al.

(10) Patent No.: US 7,548,391 B2
(45) Date of Patent: Jun. 16, 2009

(54) TEMPERATURE-ADAPTIVE OPEN-LOOP CONTROL OF ACTIVE LATCH

(75) Inventors: Yanning Liu, San Ramon, CA (US); Yanchu Xu, San Jose, CA (US); Mike Leis, Framingham, MA (US)

(73) Assignee: Seagate Technology, LLC, Scotts Valley, CA (US)

( * ) Notice: Subject to any disclaimer, the term of this patent is extended or adjusted under 35 U.S.C. 154(b) by 0 days.

(21) Appl. No.: 11/789,218

(22) Filed: Apr. 23, 2007

(65) Prior Publication Data
US 2008/0019053 A1 Jan. 24, 2008

Related U.S. Application Data

(60) Provisional application No. 60/745,612, filed on Apr. 25, 2006.

(51) Int. Cl.
*G11B 21/02* (2006.01)
(52) U.S. Cl. ............... 360/75; 360/256.2; 360/256.3
(58) Field of Classification Search ............... None
See application file for complete search history.

(56) References Cited

U.S. PATENT DOCUMENTS

| 6,275,357 B1 * | 8/2001 | Jang ............... 360/256.3 |
| 6,757,127 B1 * | 6/2004 | Teng et al. ............ 360/77.02 |
| 7,203,019 B1 | 4/2007 | Liu et al. |
| 2005/0046992 A1 * | 3/2005 | Yeo et al. ............ 360/75 |

* cited by examiner

*Primary Examiner*—Andrew L Sniezek
(74) *Attorney, Agent, or Firm*—Shumaker & Sieffert, P.A.

(57) ABSTRACT

An apparatus and method for latching an actuator arm assembly can position a read/write head relative to a data storage disk in a disk drive. A latch arm is configured to be moved between a closed position that inhibits movement of an actuator arm assembly in a landing zone and an open position that does not inhibit movement of the actuator arm assembly in the landing zone. A coil is configured to generate an electromagnetic force on the latch arm responsive to a coil current. A bias device is configured to provide a bias force on the latch arm that is substantially opposed to the electromagnetic force from the coil. The latch operating current/voltages is controlled and modified according to environmental conditions such as temperature.

18 Claims, 6 Drawing Sheets

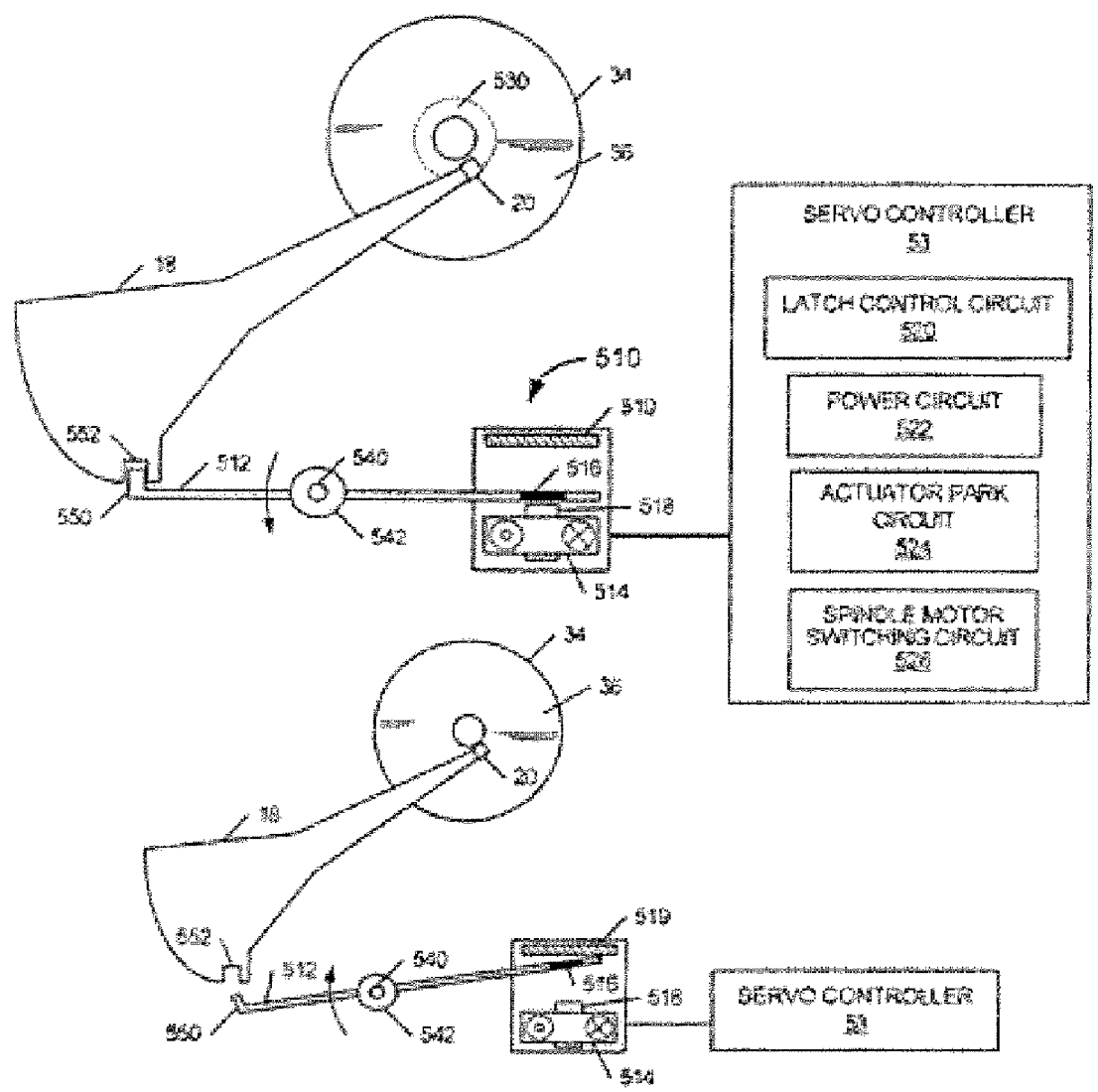
FIG. 5 (top) and FIG. 6 (bottom)

TEMPERATURE-ADAPTIVE OPEN-LOOP CONTROL OF ACTIVE LATCH

CROSS-REFERENCE TO RELATED PATENT APPLICATIONS

This application claims the benefit of and priority to U.S. Provisional Patent Application No. 60/745,612, filed Apr. 25, 2006, the disclosure of which is hereby incorporated herein by reference as if set forth in its entirety.

BACKGROUND

1. Field of the Invention

The present invention generally relates to disk drive data storage devices and, more particularly, to methods and apparatus for temperature-adaptive open-loop control of active latch.

2. Description of the Related Art

Disk drives are widely used in computers and data processing systems for storing information in digital form. Conventional disk drives include a head stack assembly, one or more data storage disks and a spindle motor that rotates the storage disks. The head stack assembly includes an actuator motor and an actuator arm assembly that includes read/write heads mounted to flexure alms. The actuator motor can rotate the flexure arms and read/write heads about a pivot bearing relative to the storage disks.

The read/write heads are configured to fly upon air bearings in very close proximity to the rotating storage disks. Unfortunately, contact between the heads and the storage disks can result in damage to the storage disks and the actuator arm assembly.

In some disk drives, the actuator motor positions the heads over a landing zone on the disks as power is removed from the spindle motor. The landing zone can be a ramp that is positioned near each of the storage disks. Alternately, the landing zone can be a textured, non-data region of each of the storage disks.

However, even when the head is positioned safely in the landing zone, a sufficient force or shock to the disk drive may cause the heads to move from the landing zone onto data storage surfaces of the storage disks. Conventional disk drives attempt to address this problem with a latch that inhibits movement of the actuator arm assembly, and thus the head, relative to the storage disks during non-rotation of the storage disks.

One type of convention latch is a bi-stable latch that can be moved between a closed position and an open position. In the closed position, it latches the actuator arm assembly to inhibit movement of the head from the landing zone. In the open position it allows the head to be freely moved from/to the landing zone. A bi-stable latch typically includes a coil and a bias device such as, but not limited to a permanent magnet. The bias device can maintain the latch in the closed position while the disk drive is turned off. To open the latch, a sufficient current is conducted through the coil to overcome the magnetic force of the permanent magnet or bias device to cause the latch to move to the open position. The latch is closed by removing the coil current, which allows the permanent magnet or bias device to return the latch to the closed position. The coil current is typically generated through an open-loop control circuit without latch position feedback because a sensor for sensing latch position can be costly and add to the complexity of the latch. Accordingly, in operation the latch is alternately switched between the open position where it rests on the coil or an open position limit and the closed position where it rests on the bias device or a closed position limit.

When the latch switches between the open and closed positions, the alternating contact of the latch with the coil and bias device may cause undesirable noise to be generated from the disk drive. The latch switching may also cause wear to the latch and/or actuator arm assembly, which may generate loose material within the disk drive that can damage the heads, storage surface of the disks, and/or other components of the disk drive.

The open loop latch operation (open/close) current or voltage profile can be shaped to achieve several benefits, such as quiet operation, less wear and tear, reliability and power conservation. However, the performance of the open-loop current/voltage is subjected to the large variations of temperature operation range for Hard Disk Drives (HDD).

The current applied is very often provided via Pulse Width Modulation mode (PWM). At lower temperatures, the coil resistance is smaller and the effective current in the coil with the same PWM duty cycle and frequency is larger. On the other hand, when the temperature is higher, the effective current in the coil will be smaller due to the higher resistance of the coil. As a result, the magnetic field generated at a lower temperature is stronger than that generated at a higher temperature, thus resulting in different performance of the latch.

Previously, the performance of the latch was compromised to cover a wide operation temperature range. For example, to make sure latch will open reliably, the open and hold current/voltage had to be designed based on the worst case scenario—based on the highest coil resistance and lowest power supply voltage. As a result of this, a number of undesired effects such as power waste, extra latch wear and tear, and noisy operation can be generated.

SUMMARY OF THE DISCLOSURE

In one embodiment of the present invention, a latch apparatus is configured to latch the actuator arm assembly of a given disk drive. The latch apparatus includes a latch arm, a latch control unit, a coil, and a bias device such as, but not limited to a permanent magnet. The latch arm is configured to be moved between a closed position that inhibits the movement of the actuator arm assembly in a landing zone and an open position that does not inhibit movement of the actuator arm assembly in the landing zone. The coil is configured to generate an electromagnetic force on the latch arm responsive to a coil current. The bias device is configured to generate a magnetic force on the latch arm that is substantially opposed to the electromagnetic force from the coil. One aspect of the present invention is to provide a way to scale or shape the latch operating current/voltage according to the drive operation environment conditions, such as temperature. The magnetic field generated at a lower temperature is stronger than that generated at a higher temperature.

In another embodiment of the present invention, a temperature reading of an in-drive temperature sensor is used to scale the current/voltage applied to the latch coil so that it will provide the best performance over a wide range of operation temperature.

BRIEF DESCRIPTION OF THE DRAWINGS

FIG. 5 is a block diagram of a servo controller and a latch apparatus that has latched an actuator arm assembly and is configured in accordance with some embodiments of the present invention.

FIG. 6 is a block diagram of the servo controller and the latch apparatus of FIG. 5, but in which the actuator arm assembly is no longer latched.

DETAILED DESCRIPTION OF THE PREFERRED EMBODIMENTS

Figure 1:
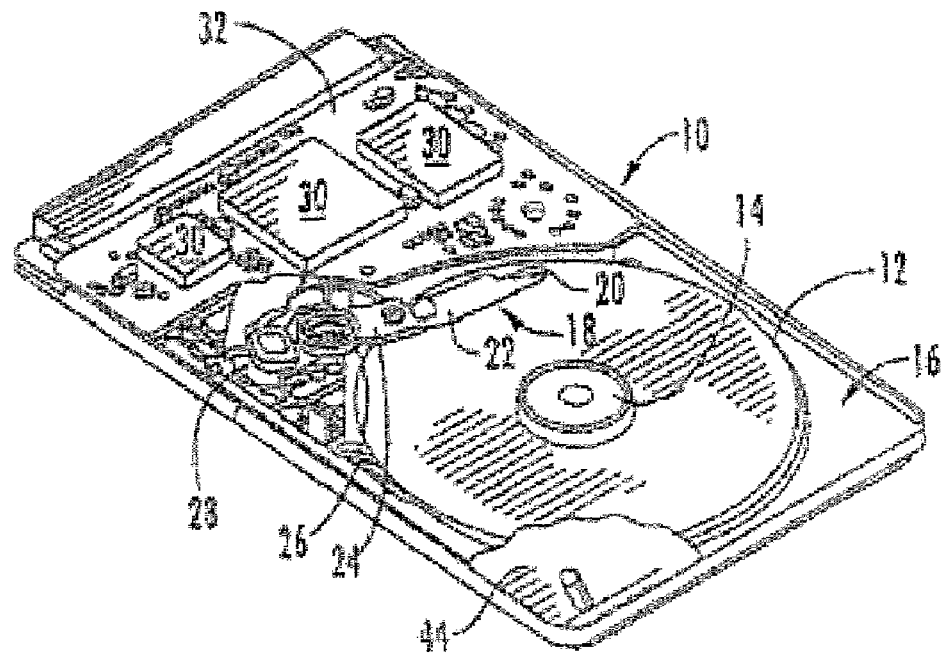
FIG. 1 is a perspective view of a disk drive with electronic circuits that are configured in accordance with some embodiments of the present invention.

Reference will now be made to the accompanying drawings, which assist in illustrating various pertinent features of the embodiments of the present invention. Although embodiments of the present invention will now be described primarily in conjunction with disk drives, it should be expressly understood that embodiments of the present invention may be applicable to other applications as well. For example, embodiments of the present invention may be applied to compact disc (CD) drives, digital versatile disk (DVD) drives, and the like. In this regard, the following description of a disk drive is presented for purposes of illustration and description. Like numbers refer to like elements throughout the description of the figures.

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a" "an" and "the" are intended to include the plural forms as well, unless the context clearly indicates otherwise. As used herein the terms "and/or" and "I" include any and all combinations of one or more of the associated listed items. It will be understood that, although the terms first, second, etc. may be used herein to describe various elements and/or regions, these elements and/or or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write and read commands from a host. A host can include, but is not limited to, a desktop computer, a laptop computer, a personal digital assistant (PDA), a digital video recorder/player, a digital music recorder/player, and/or another electronic device that can be communicatively coupled to store and retrieve data in the disk drive 10.

The actuator arm assembly 18 includes a head 20 (or transducer) mounted to a flexure arm 22 which is attached to an actuator arm 24 that can rotate about a pivot bearing assembly 26. The head 20 may, for example, comprise a magnetoresistive (MR) element and/or a thin film inductive (TFI) element. An actuator motor 28 (e.g., a voice coil motor (VCM)) rotates the actuator arm assembly 18 to radially move the head 20 relative to the disk stack 12. The spindle motor 14 and actuator arm assembly 18 are coupled to a controller, read/write channel circuits, and other associated electronic circuits 30 which can be enclosed within one or more integrated circuit packages mounted to a printed circuit board (PCB) 32. The electronic circuits 30 may include analog and/or digital circuitry, and typically includes a digital signal processor (DSP), a microprocessor-based controller and a random access memory (RAM) device.

Figure 2:
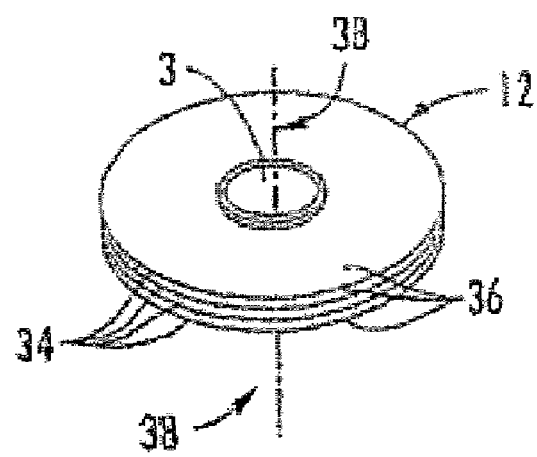
FIG. 2 is a block diagram of a disk stack having a plurality of data storage disks.

Referring now to the illustration of FIG. 2, the disk stack 12 typically includes a plurality of disks 34, each of which may have a pair of disk surfaces 36. The disks 34 are mounted on a cylindrical shaft and are configured to rotate about axis 38. The spindle motor 14 as mentioned above, rotates the disk stack 12. Although the disks 34 are described as magnetic disks for purposes of illustration, they may alternatively be optical disks or any other type of rewritable data storage disk.

Figure 3:
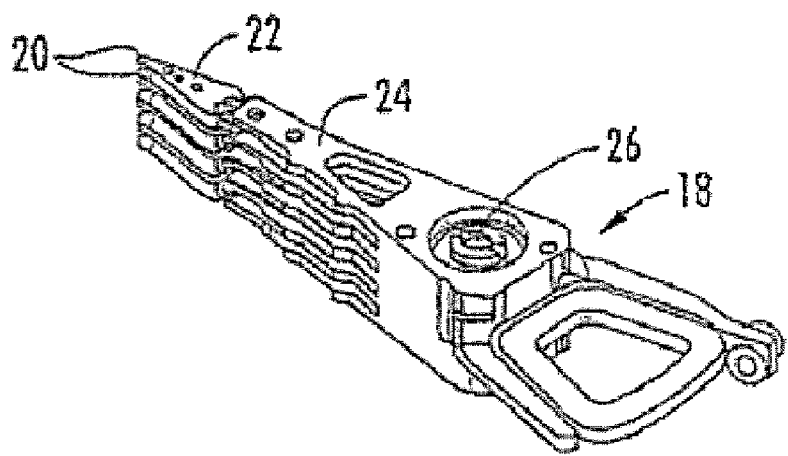
FIG. 3 is a perspective view of a portion of an actuator arm assembly having a plurality of actuator arms.

Referring now to the illustration of FIGS. 1 and 3, the actuator arm assembly 18 includes a plurality of the heads 20, each of which are adjacent to a different one of the disk surfaces 36. Each head 20 is mounted to a corresponding flexure arm 22 which is attached to a corresponding portion of the actuator arm 24 that can rotate about the pivot bearing assembly 26, the actuator motor 28 operates to move the actuator arm 24, and thus moves the heads 20 relative to their respective disk surfaces 36.

Figure 4:
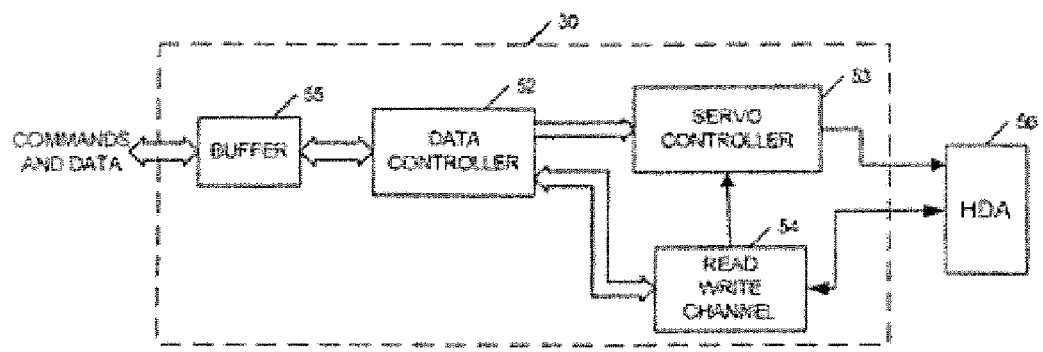
FIG. 4 is a block diagram of a portion of the controller and other electronic circuits of the disk drive shown in FIG. 1 according to some embodiments of the present invention.

Referring to FIG. 4, the electronic circuits 30 can include a data controller 52, a servo controller 53, a read write channel 54, and a buffer 55. The exemplary embodiment of the electronic circuits 30 has been illustrated with two separate controllers 52, 53, buffer 55, and a read write channel 54 for purposes of illustration and discussion only. It is to be understood that the functionality that is described herein for the controllers 52, 53, buffer 55, and/or the read write channel 54 may be integrated within one integrated circuit package or distributed among more than one integrated circuit package. The head disk assembly (HDA) 56 can include the actuator arm assembly 18, the disk stack 12, the actuator motor 28, and the spindle motor 14.

Write commands and associated data from a host are buffered in the buffer 55. The data controller 52 is configured to carry out buffered write commands by formatting the associated data into blocks with the appropriate header information, and to transfer the formatted data from the buffer 55, via the read/write channel 54, to Logical Block Addresses ("LBAs") on the disk 34 that are identified by the associated write command.

The read write channel 54 can operate in a conventional manner to convert data between the digital form used by the data controller 52 and the analog form conducted through the preamplifier 60 to the heads 20 in the HDA 56 (See. FIG. 6). The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34, and to maintain the head 20 aligned with the track while data is written/read on the disk 34.

FIG. 5 further illustrates an example of a servo controller 53 and a latch apparatus 510 that is configured to releasably latch the actuator arm assembly 18 so that the head 20 can be selectively inhibited from moving from a landing zone 530. The latch apparatus 510 can include a latch arm 512, an electrical coil 514, a bias device such as, but not limited to a permanent magnet 516, and a latch control circuit 520. The latch apparatus 510 may further include a power circuit 522, an actuator park circuit 524, and a spindle motor switching circuit 526. The latch control circuit 520, the power circuit 522, the actuator park circuit 524, and/or the spindle motor switching circuit 526 may reside in the servo controller 53 as shown in FIG. 5. One or more of 520, 522, 524, and 526 can be outside of servo controller.

When a loss of power to the disk drive 10 is sensed and/or when the disk drive 10 is commanded to turn-off, the actuator park circuit 524 commands the actuator motor 28 to move the actuator arm assembly 18 so that the head 20 is positioned in the landing zone 530 where it can be latched by the latch arm 512. When the head 20 is in the landing zone 530 it may rest on a ramp or a landing area on the disk 34. The landing area may correspond to, for example, a laser texture zone on each disk surface 36 that includes a laser roughened surface that can reduce stiction of the head 20 when parked (e.g., resting) thereon. When a ramp is used in the landing zone 530, it may be configured to prevent contact between the head 20 and the disk 34 when the head 20 is parked on the ramp. A ramp is typically located in a landing zone adjacent to an outer periphery of the disk 34, and a landing area is typically located in a landing zone adjacent to an inner periphery of the disk 34.

Accordingly, although the landing zone 530 has been illustrated along an inner periphery of the disk, it is to be understood that it may instead by located anywhere on or adjacent to the surface 36 of the disk 34 without departing from embodiments of the present invention. Representative ramps are discussed in U.S. Pat. No. 6,452,753 and U.S. Pat. No. 6,480,361.

The spindle motor switching circuit 526 can be connected to the spindle motor 14 and configured to switch the motor 14 from acting as a driving motor for spinning the disk stack 12 to acting as a generator for powering the actuator motor 28, the actuator park circuit 524, the latch control circuit 520, other components of the servo controller 53, and/or other electronic and/or electromechanical components of the disk drive 10. The switching may be responsive to the power circuit 522 sensing loss of power to the disk drive 10.

The latch arm 512 is configured to pivot about a shaft 540 coupled to a bearing 542 and to be moved by the coil 514 and bias device 516 between a closed position and an open position. The latch arm 512 is shown in FIG. 5 in the closed position where an extended portion 550 of the latch arm 512 extends into a recessed portion (e.g., slot) 552 of the actuator arm assembly 18 to retain the head 20 in the landing zone 530 where may rest on a landing area or ramp. Referring to FIG. 6, the latch arm 512 is shown in the open position where the extended portion 550 thereof does not extend into the recessed portion 552 of the actuator arm assembly 18 and, consequently, the actuator motor 28 may freely rotate the actuator arm assembly 18 to remove the head 20 from the landing zone 530. Other latching arrangements are also possible. For example, the extended. portion 550 may be part of the actuator arm assembly 18 and the recessed portion 552 may be part of the latch arm 512. In a further example, the latch arm 512 and actuator arm assembly 18 may include mating groves or teeth and/or mating pins and slots.

Referring to FIGS. 5 and 6, the bias device 516 may be attached to the latch arm 512, the coil 514 may extend around an iron core 518 (or core of other material that is sufficiently magnetic) that is aligned with the bias device 516. The bias device 516 and core 518 are configured to be magnetically attracted to one another so that bias device 516 generates a magnetic force on the latch arm 512 that is sufficient, in the absence of at least a threshold electromagnetic force exerted thereon by the activation of coil 514, to move the latch arm 512 toward the core 518 to the closed position, where the latch arm 512 contacts the core 518. The latch control circuit 520 is configured to generate a current through the coil 514 which polarizes the core 518 opposite to an adjacent core of the bias device 516 so as to exert an electromagnetic force on the bias device 516 and the connected latch arm 512. The illustrated circle-cross and circle-dot in the coil 514 indicate opposite directions of current flow, such as in a direction out of the paper and a direction into the paper. The electromagnetic force by the activation of coil 514 on the latch arm 512 opposes and overcomes the magnetic force on the latch arm 512 by the bias device 516.

Accordingly, while the disk drive 10 is turned-off, the bias device 516 retains the latch arm 512 in the closed position (FIG. 5) where the latch arm 512 can, in turn, inhibit movement of the actuator arm assembly 18 from the landing zone 530. To unlatch the actuator arm assembly 18, the latch control circuit 520 generates a sufficient current through the coil 514 to activate the coil to generate a force against the latch arm 512 that exceeds the force from the bias device 516 and other forces, such as frictional forces between the extended portion 550 and recess portion 552 and that are associated with the shaft 540 and bearing 542, so that the latch arm 512 rotates to the open position (FIG. 6) where it contacts a crash-stop 519. The servo controller 53 can command the actuator motor 28 to move the actuator arm assembly 18 away from the landing zone 530 while the latch arm 512 is held in the open position, after which the latch control circuit 520 can stop the current through the coil 514 and allow the latch arm 512 to return to the closed position under the bias device.

The latch control circuit 520 can control the current through the coil 514 to cause the latch arm 512 to alternately move between the open and closed positions. The latch control circuit 520 could simply toggle the coil current between zero and a threshold level to cause the latch arm 512 to switch between open/closed positions. However, if the coil current is abruptly stopped (e.g., as with a trailing edge of a square wave current) while the latch arm 512 is in the open position (FIG. 6), the latch arm would be subject to a torque that increases rapidly as it approaches the closed position. Accordingly, the latch arm 512 would exhibit a rapidly increasing acceleration until it crashed into the core 518. Similarly, if the coil current is abruptly increased (e.g., as with a leading edge of a square wave current) above the threshold needed to overcome the bias force from the bias device 516, the latch arm 512 in the closed position (FIG. 5) would be subjected to a rapidly increasing torque as it approached the open position until it crashed into the crash stop 519. Such alternating impact by the latch arm 512 with the crash stop 519 and core 518 may generate undesirable noise and/or increase wear of one or more of the mechanical components of the latch apparatus 510.

As explained previously, the open loop latch operation (open/close) current voltage profile can be shaped to achieve several benefits, such as quiet operation, less wear and tear, reliability and power conservation. However, the performance of the open-loop current/voltage is subjected to the large variations of temperature operation range for HDD. The current applied is very often provided via PWM. At lower temperature, the coil resistance is smaller and the effective current in the coil with the same PWM duty cycle and frequency is larger. On the other hand, when the temperature is higher, the effective current in the coil will be smaller due to the higher resistance. As a result, the magnetic field generated at lower temperature is stronger than that generated at higher temperature, thus resulting different performance of the latch.

Figure 7:
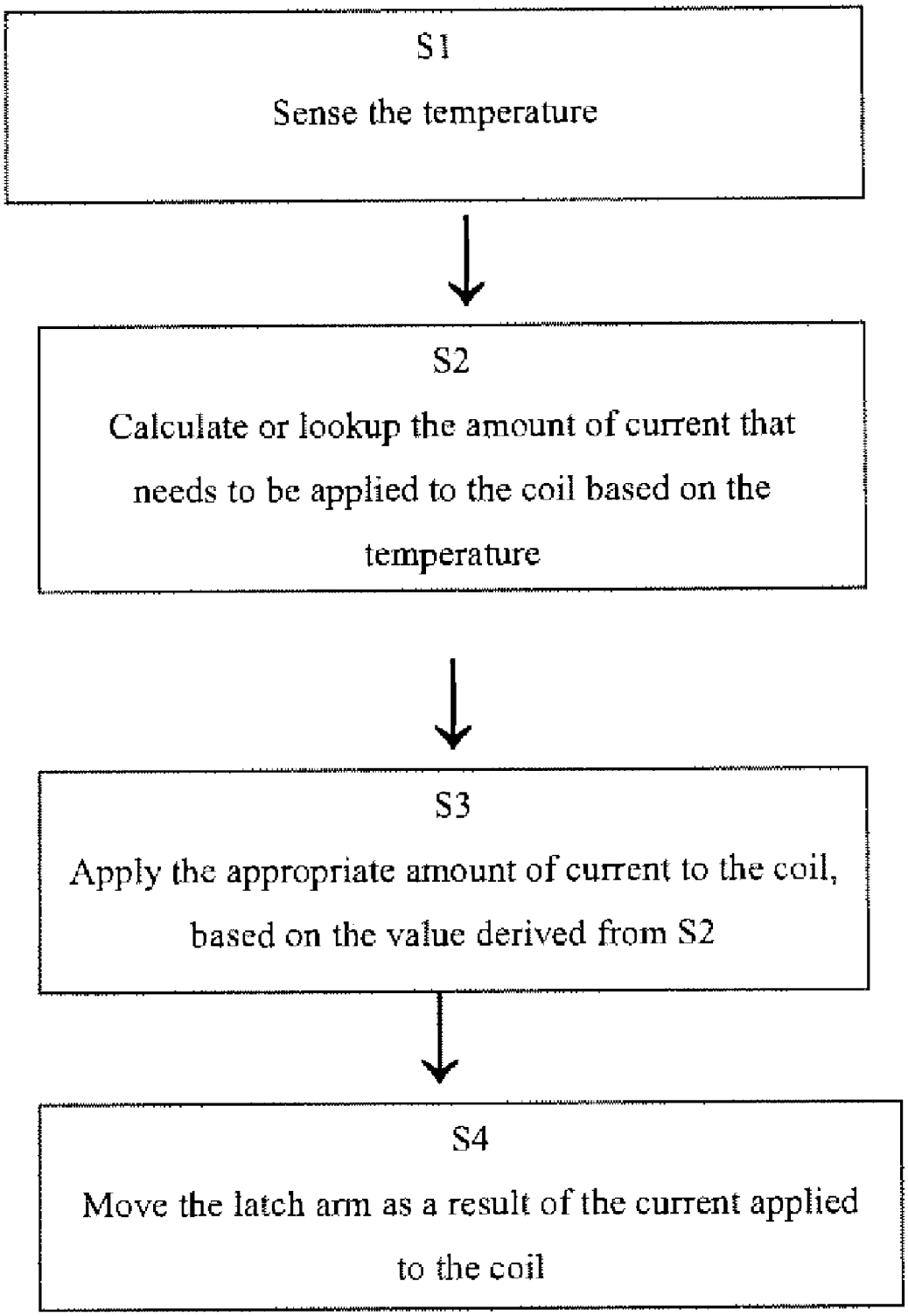
FIG. 7 is a flow chart showing the procedural steps of a disclosed method for operating an embodiment of the present invention.

In one embodiment of the present invention, a latch apparatus FIG. 6 is configured by the method described in FIG. 7 to latch the actuator arm assembly (shown in FIG. 3) of the disk drive of FIG. 1. This embodiment further comprises an in-drive temperature sensor such as a thermistor. The temperature reading from the sensor is used to scale the current/voltage applied to the latch coil so that it can provide the best performance over a wide range of operating temperatures. Since most disk drives currently have a thermistor installed, no extra costs will be incurred in using this embodiment.

In the method described in FIG. 7, first in step S1, the temperature surrounding the disk drive's latch is sensed. Then in step S2 based on the temperature sensed, an appropriate amount of current is calculated or is looked up from a pre-calculated table. Below is an example of the type of information that would be reflected in such a table. Table 1 shows the effective current of a 50 ohms coil at 25 c with a 5v power supply. At 25 c, the effective current is 100 mA. At 0 c, the effective current increases by 10.9% to 110.90 mA. At 70 c, the effective current is reduced by 15.0% to 84.97 mA.

| effective current of a 50 ohms coil w/ a 5 V supply | | | |
|---|---|---|---|
| | temperature | | |
| | 0 C. | 25 C. | 70 C. |
| latch resistance | 45.09 | 50 | 58.84 |
| effective current (mA) | 110.90 | 100.00 | 84.97 |
| percentage change | 10.9% | 0.0% | −15.0% |

Next in step S3, the proper amount of current is applied to the coil. As a result of this, the latch arm will be moved between a closed position that inhibits the movement of the actuator arm assembly in a landing zone and an open position that does not inhibit the movement of the actuator arm assembly in the landing zone as shown in step S4.

In other words, the latch control circuit 520 is configured to ramp-up, during a ramp-up time, the coil current to at least an upper defined level with respect to the temperature reading, to cause the coil 514 to move the latch arm 512 from the close position to the open position. The latch control circuit 520 is configured to ramp-down, during a ramp-down time, the coil current to no more than a lower defined level with respect to the temperature reading, to cause the bias device 516 to move the latch arm 512 from the open position to the closed position. The coil is configured to generate an electromagnetic force on the latch arm responsive to the coil current. The bias device is configured to generate a magnetic force on the latch arm that is substantially opposed to the electromagnetic force from the coil.

One aspect of the present invention is to provide a way to scale or shape the latch operating current/voltage according to the drive operation environment conditions, such as temperature. The magnetic field generated at lower temperature is stronger than that generated at higher temperature as described below using FIG. 8 and FIG. 9.

Figure 8:
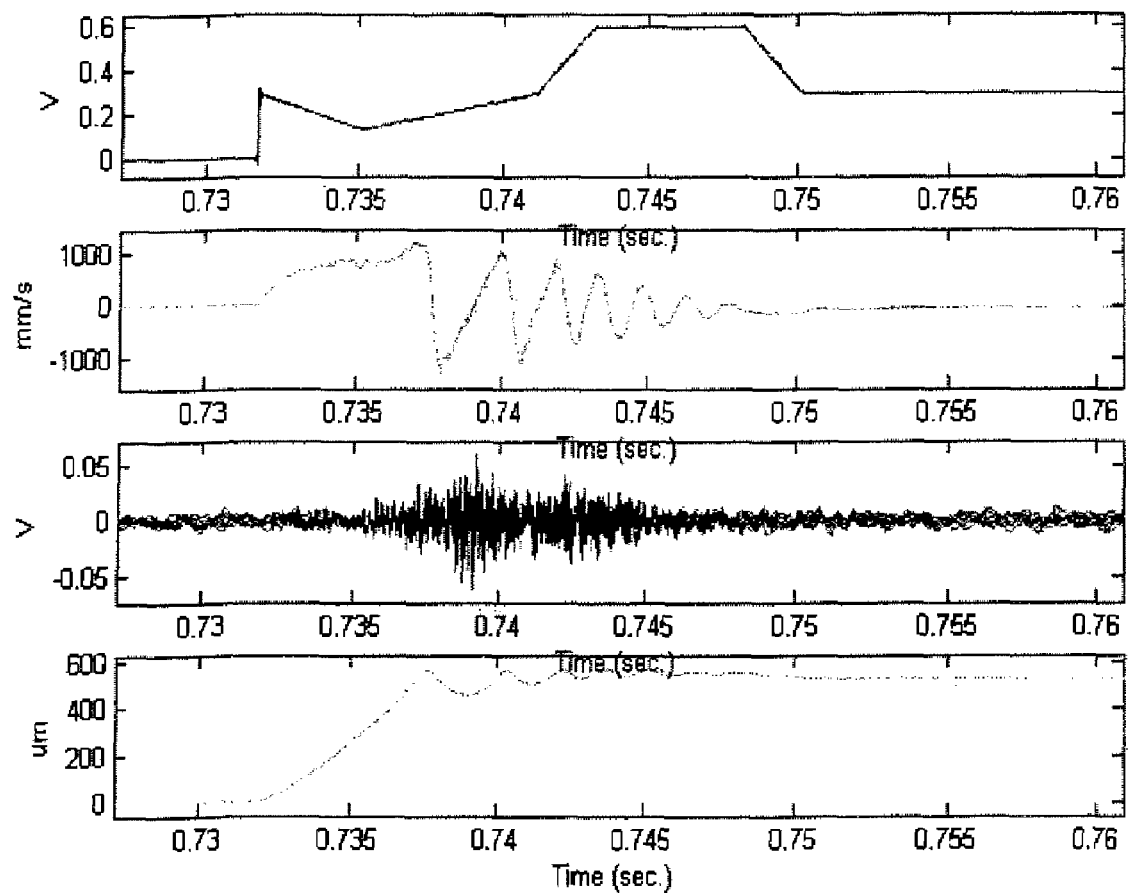
FIG. 8 shows the velocity, sound, and displacement signals of a latch when it is driven by a control voltage at 25 c.

The top plot in FIG. 8 represents the control voltage that is applied to the latch for opening and keeping the latch open. The $2^{nd}$ plot represents the velocity of the latch arm 512. It is measured at one location with a non-contact velocity sensor applied to the open voltage shown in the $1^{st}$ plot. The $3^{rd}$ plot represents the sound pressure when the latch arm rotates and hits the open limit position. The $4^{th}$ plot is the latch arm position obtained from the integration of the measured velocity signal shown in $2^{nd}$ plot.

Before 0.732 second, the latch arm is at the closed position—0 value shown in the $4^{th}$ plot. From 0.732 to 0.737 second (5 ms total), the latch arm moves from the closed position to the open position—about 0.6 mm (or 600 μm) as shown in the $4^{th}$ plot. From 0.737 to 0.748 second, the latch arm shakes around the open position because it has hit the open position limit. Notice the velocity and displacement oscillations in the $2^{nd}$ and $4^{th}$ plots during that time period. After 0.748 second, the latch arm settles down at the open position. From 0.748 to 0.75 second, the control voltage is dropped from ~0.6V to ~0.3V to save power. Due to the design of the latch considered here, after it is open, less control voltage/current is needed to hold it open.

Figure 9:
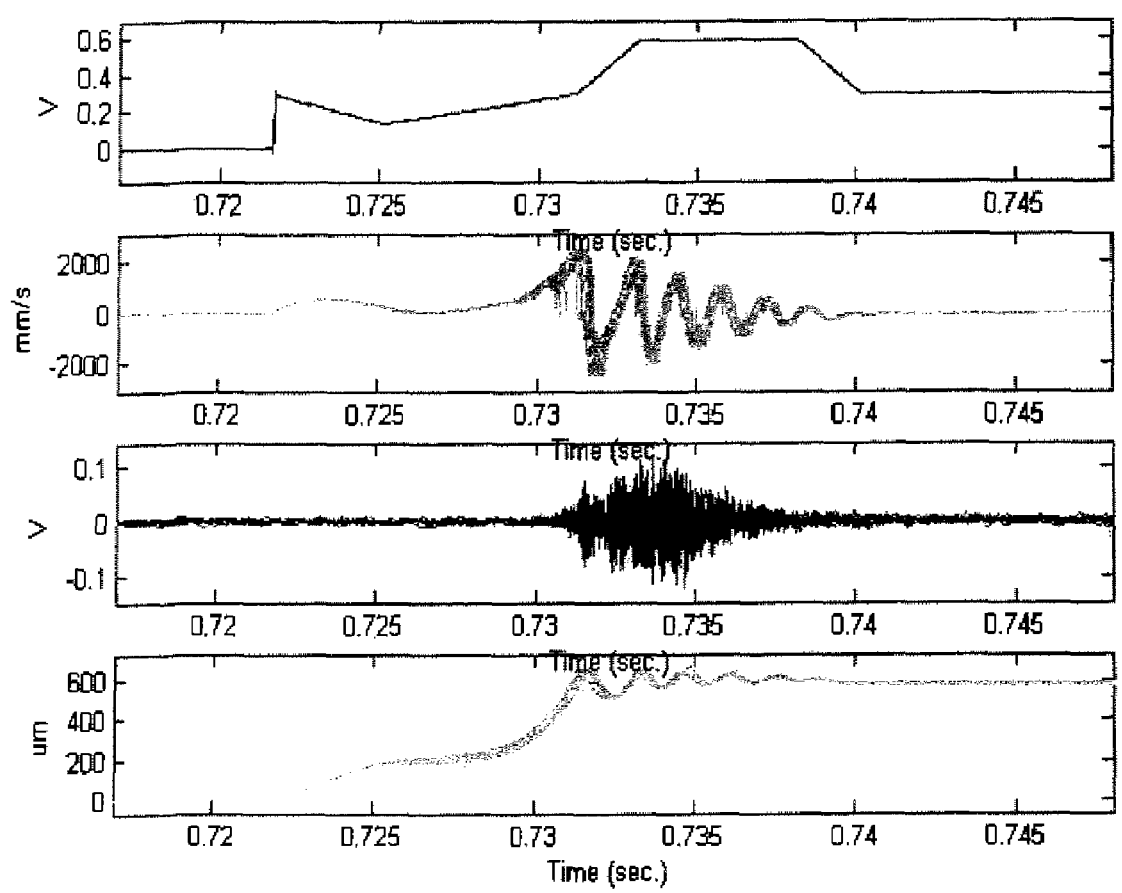
FIG. 9 shows the velocity, sound, and displacement signals of the latch of FIG. 8 driven by the same control voltage but at 0 c.

FIG. 9 describes a similar latch opening process. The same control voltage is applied to the same latch described in FIG. 8. The only difference here is that now the latch is cold at 0° C. The open voltage (shown in the top plot) in the FIG. 9 is exactly the same as that shown in FIG. 8. However, due to the lower temperature, the latch coil resistance is higher and the effective current in the coil is less as compared to the case that was shown in FIG. 8 at 25° C. As a result, the arm behavior is quite different. Since the effective current is smaller, the magnetic field generated is weaker and it now takes a longer time to move the latch arm from the closed position to the open position. After the application of the control voltage at 0.722 second, the latch arm hits open limit position at about 0.731 second. In other words, it takes about 9 milliseconds at 0° C. to move the arm as compared to the 5 milliseconds at 25° C. The velocity trajectory shown in the $2^{nd}$ plot and the position trajectory shown in the $4^{th}$ plot are also drastically different at 0° C. as compared to those at 25° C. The final limit position hit velocity at 25° C. is about 1000 millimeters per second. But at 0° C., the hit velocity is more than 2000 millimeters per second. As a result, the arm hit sound at 0° C., shown in the $3^{rd}$ plot of FIG. 4, is significantly higher than that at 25° C.

The longer the open time is at 0° C., the slower the drive startup is, and also the longer the wait times for a users. The higher the hit velocity, the higher the probability for particle generation and latch wear, which is bad for drive reliability. The noisier the hit sound, the worse the users' experiences. All these are due to the fact that the latch is controlled via voltage. But the latch behavior is determined by coil current. As temperature changes, the coil current will be different with the same applied control voltage due to the temperature dependent resistances. By using temperature information as described here, the control voltage can be scaled to generate the same effective current at different temperature, which will essentially lead to consistent latch behavior.

By adjusting the latch drive current to compensate for temperature variations, good performance can be ensured in wide operational temperature ranges that can lead to power saving, less latch wear and tear, less particle generation, quiet latch operation, and robustness of the latch operation.

Another embodiment of the present invention further comprises a shock sensor to generate feedback for operation of the latch.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A latch apparatus for latching an actuator arm assembly that positions a read/write head relative to a data storage medium, the latch apparatus comprising:
   a latch arm that is configured to be moved between a closed position that inhibits movement of the actuator arm assembly in a landing zone and an open position that does not inhibit movement of the actuator arm assembly in the landing zone;
   a coil that is configured to generate an electromagnetic force on the latch arm responsive to a coil current; and
   wherein the coil has an input current that is adjusted according to an operation environment condition.

2. The latch apparatus of claim 1, wherein the operation environment condition is temperature.

3. The latch apparatus of claim 2, further comprising a temperature sensor, wherein the temperature sensor is configured to provide a reading of the temperature to the latch control circuit.

4. The latch apparatus of claim 3, wherein the latch drive circuit is configured to adjust the input current based on the temperature reading.

5. The latch apparatus of claim 4, wherein the latch control circuit is configured to 1) decrease the input current when the temperature reading is lowered, and 2) increase the input current when the temperature reading is raised.

6. The latch apparatus of claim 3, wherein the latch drive circuit is configured to generate a new input current for each temperature reading.

7. The latch apparatus of claim 1, further comprising a bias device that is configured to generate a magnetic force on the latch arm that is substantially opposed to the electromagnetic force from the coil.

8. The latch apparatus of claim 7, further comprising a latch control circuit that is configured to increase over a defined opening time period the coil current to at least an upper defined level to cause the coil to move the latch arm from the closed position to the open position, and to decrease over a defined closing time period the coil current to no more than a lower defined level to cause the bias device to move the latch arm from the open position to the closed position.

9. The latch apparatus of claim 8, wherein the bias device is a permanent magnet.

10. A method for latching an actuator arm assembly that positions a read/write head relative to a data storage disk of a disk drive, the latch method comprising:
    configuring a latch arm to be moved between a closed position that inhibits movement of the actuator arm assembly in a landing zone and an open position that does not inhibit movement of the actuator arm assembly in the landing zone;
    configuring a coil to generate an electromagnetic force on the latch arm responsive to a coil current; and
    wherein an input current to the coil is adjusted according to an operation environment condition.

11. The latch method of claim 10, wherein the operation environment condition is temperature.

12. The latch method of claim 11, further comprising a step for providing a reading of temperature using a temperature sensor to the latch control circuit.

13. The latch method of claim 12, further comprising a step for adjusting the input current based on the temperature reading.

14. The latch method of claim 12, wherein a new input current is generated for each temperature reading.

15. The latch method of claim 12, wherein the configuring of the latch control circuit further comprises: 1) decreasing the amount of coil current when the temperature reading is lowered, and 2) increasing the amount of coil current when the temperature reading is raised.

16. The latch method of claim 10, further comprising a step for configuring a bias device to generate a magnetic force on the latch arm that is substantially opposed to the electromagnetic force from the coil.

17. The latch method of claim 16, further comprising a step for configuring a latch control circuit to increase over a defined opening time period the coil current to at least an upper defined level to cause the coil to move the latch arm from the closed position to the open position, and to decrease over a defined closing time period the coil current to no more than a lower defined level to cause the bias device to move the latch arm from the open position to the closed position.

18. The latch method of claim 16, wherein the bias device is a permanent magnet.

* * * * *